US010202170B2

(12) United States Patent
Dagher et al.

(10) Patent No.: US 10,202,170 B2
(45) Date of Patent: Feb. 12, 2019

(54) HULL FOR A FLOATING WIND TURBINE PLATFORM

(71) Applicant: University of Maine System Board of Trustees, Bangor, ME (US)

(72) Inventors: Habib J. Dagher, Bangor, ME (US); Anthony M. Viselli, Bangor, ME (US); Mark Dwyer, Bangor, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 15/567,199

(22) PCT Filed: Apr. 20, 2016

(86) PCT No.: PCT/US2016/028358
§ 371 (c)(1),
(2) Date: Oct. 17, 2017

(87) PCT Pub. No.: WO2016/172149
PCT Pub. Date: Oct. 27, 2016

(65) Prior Publication Data
US 2018/0134344 A1    May 17, 2018

Related U.S. Application Data

(60) Provisional application No. 62/149,947, filed on Apr. 20, 2015.

(51) Int. Cl.
*B63B 35/44* (2006.01)
*B63B 1/10* (2006.01)
(Continued)

(52) U.S. Cl.
CPC ............... *B63B 1/107* (2013.01); *B63B 5/18* (2013.01); *B63B 35/44* (2013.01); *B63B 39/03* (2013.01);
(Continued)

(58) Field of Classification Search
CPC ....... B63B 35/00; B63B 35/003; B63B 35/44; B63B 2035/00; B63B 2035/44;
(Continued)

(56) References Cited

U.S. PATENT DOCUMENTS 9,394,035 B2 *   7/2016   Dagher .................. B63B 21/50
9,964,097 B2 *   5/2018   Dagher .................. F03D 13/22
(Continued)

FOREIGN PATENT DOCUMENTS

WO    2014031009 A1    2/2014
WO    2015048147 A1    4/2015

OTHER PUBLICATIONS

PCT International Search Report and Written Opinion, Application No. PCT/US2016/028358, dated Jul. 26, 2016.

*Primary Examiner* — Daniel V Venne
(74) *Attorney, Agent, or Firm* — MacMillan, Sobanski & Todd, LLC

(57) ABSTRACT

A hull for a semi-submersible wind turbine platform capable of floating on a body of water and supporting a wind turbine includes a keystone and at least three bottom beams extending radially outward of the keystone. Each bottom beam has a primary beam portion and a column base portion, wherein the column base portion is configured to support an outer column of the hull thereon, and wherein the primary beam portion defines a first ballast compartment therein. The first ballast compartment is in fluid communication with water in the body of water in which the hull is floating.

16 Claims, 12 Drawing Sheets

(51) Int. Cl.
  *F03D 13/25*    (2016.01)
  *B63B 5/18*     (2006.01)
  *F03D 13/40*    (2016.01)
  *B63B 39/03*    (2006.01)
  *B63B 13/00*    (2006.01)
  *B63B 1/12*     (2006.01)

(52) U.S. Cl.
  CPC .............. *F03D 13/25* (2016.05); *F03D 13/40* (2016.05); *B63B 2001/128* (2013.01); *B63B 2013/005* (2013.01); *B63B 2035/446* (2013.01); *F05B 2240/93* (2013.01); *F05B 2240/97* (2013.01); *Y02E 10/727* (2013.01)

(58) Field of Classification Search
  CPC ........ B63B 2035/442; B63B 2035/443; B63B 2035/446; B63B 1/10; B63B 1/107; B63B 2001/10; B63B 39/03; B63B 2013/005
  USPC ....... 114/61.12, 61.13, 61.14, 256, 264, 265, 114/266, 267
  See application file for complete search history.

(56) References Cited

U.S. PATENT DOCUMENTS

| | | |
|---|---|---|
| 2004/0131427 A1 | 7/2004 | Wybro et al. |
| 2006/0165493 A1 | 7/2006 | Nim |
| 2011/0155038 A1 | 6/2011 | Jähnig et al. |
| 2013/0183163 A1 | 7/2013 | Fyfe |
| 2016/0340000 A1* | 11/2016 | Dagher .................. B63B 9/065 |

\* cited by examiner

HULL FOR A FLOATING WIND TURBINE PLATFORM

CROSS-REFERENCE TO RELATED APPLICATIONS

This application claims the benefit of U.S. Provisional Application No. 62/149,947, filed Apr. 20, 2015 the disclosure of which is incorporated herein by reference.

BACKGROUND OF THE INVENTION

This invention relates in general to wind turbine platforms. In particular, this invention relates to an improved hull for a floating wind turbine platform.

Wind turbines for converting wind energy to electrical power are known and provide an alternative energy source for power companies. On land, large groups of wind turbines, often numbering in the hundreds of wind turbines, may be placed together in one geographic area. These large groups of wind turbines can generate undesirably high levels of noise and may be viewed as aesthetically unpleasing. An optimum flow of air may not be available to these land-base wind turbines due to obstacles such as hills, woods, and buildings.

Groups of wind turbines may also be located offshore, but near the coast at locations where water depths allow the wind turbines to be fixedly attached to a foundation on the seabed. Over the ocean, the flow of air to the wind turbines is not likely to be disturbed by the presence of various obstacles (i.e., as hills, woods, and buildings) resulting in higher mean wind speeds and more power. The foundations required to attach wind turbines to the seabed at these near-coast locations are relatively expensive, and can only be accomplished at relatively shallow depths, such as a depth of up to about 45 meters.

The U.S. National Renewable Energy Laboratory has determined that winds off the U.S. Coastline over water having depths of 30 meters or greater have an energy capacity of about 3,200 TWh/yr. This is equivalent to about 90 percent of the total U.S. energy use of about 3,500 TWh/yr. The majority of the offshore wind resource resides between 37 and 93 kilometers offshore where the water is over 60 meters deep. Fixed foundations for wind turbines in such deep water are likely not economically feasible. This limitation has led to the development of floating platforms for wind turbines. Known floating wind turbine platforms are formed steel and are based on technology developed by the offshore oil and gas industry. There remains a need in the art however, for a floating wind turbine platform hull with improved buoyancy.

SUMMARY OF THE INVENTION

This invention relates in general to floating wind turbine platforms. In particular, this invention relates to an improved hull for a floating wind turbine platform wherein the hull has improved buoyancy.

In one embodiment, the hull for a semi-submersible wind turbine platform capable of floating on a body of water and supporting a wind turbine thereon includes a keystone and at least three bottom beams extending radially outward of the keystone. Each bottom beam has a primary beam portion and a column base portion, wherein the column base portion is configured to support an outer column of the hull thereon, and wherein the primary beam portion defines a first ballast compartment therein. The first ballast compartment is in fluid communication with water in the body of water in which the hull is floating.

In another embodiment, the hull for a semi-submersible wind turbine platform capable of floating on a body of water and supporting a wind turbine thereon includes a keystone and at least three bottom beams extending radially outward of the keystone. Each bottom beam is substantially cylindrical in shape and has as substantially circular transverse cross section.

Various aspects of this invention will become apparent to those skilled in the art from the following detailed description of the preferred embodiment, when read in light of the accompanying drawings.

DETAILED DESCRIPTION OF THE PREFERRED EMBODIMENT

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figures 1, 1A:
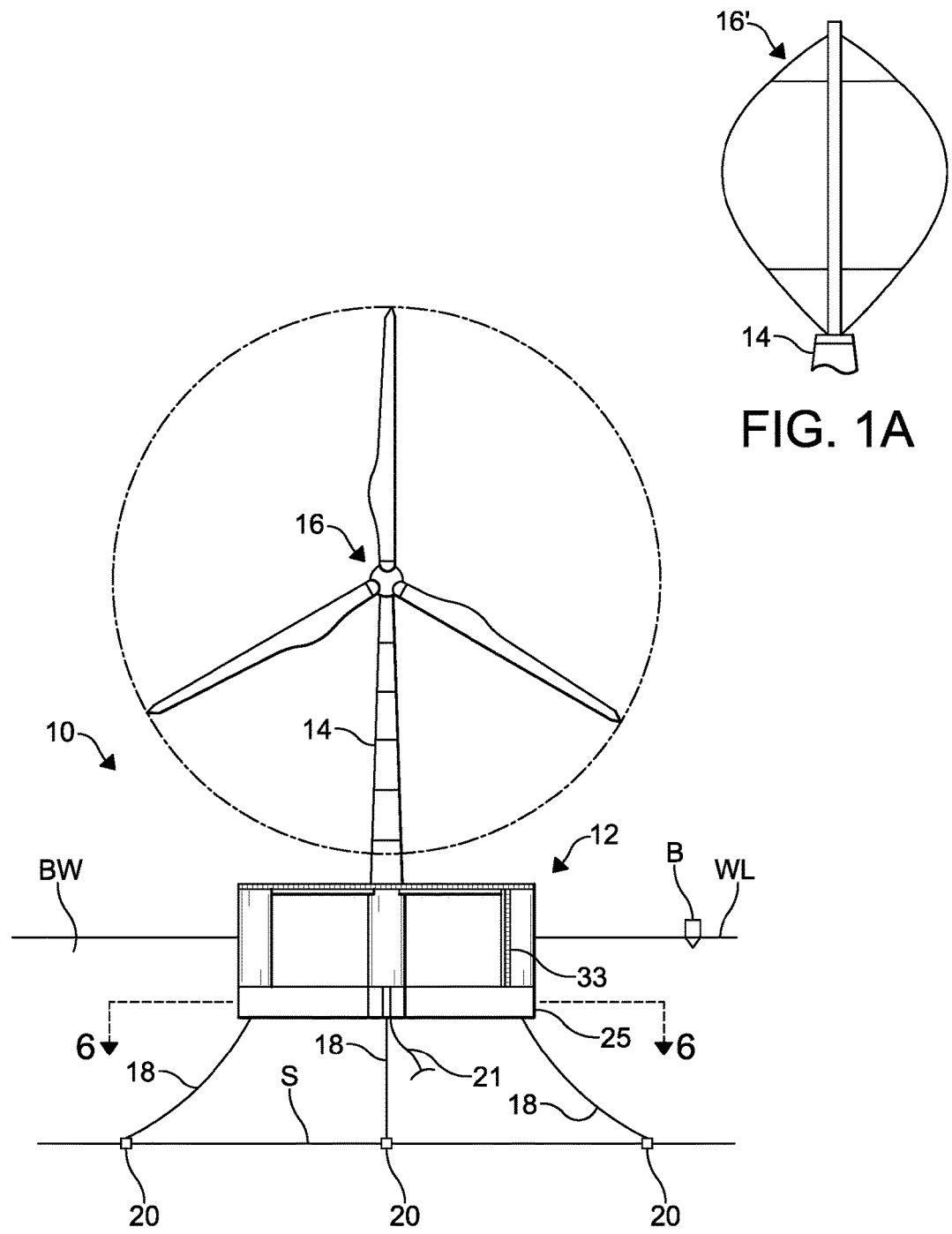
FIG. 1 is an elevational view of a floating wind turbine platform including an improved hull according to this invention.
FIG. 1A is an enlarged elevational view of portion of an alternate embodiment of the floating wind turbine platform illustrated in FIG. 1 showing a vertical-axis wind turbine.

Referring to the drawings, particularly to FIG. 1, a first embodiment of a floating wind turbine system or platform 10 is shown anchored to a bed of a body of water BW. In the illustrated embodiment, the floating wind turbine platform 10 is shown anchored to the seabed S. It will be understood that the seabed may be the bed of any body of water in which the floating wind turbine platform 10 will be placed into operation.

The illustrated floating wind turbine platform 10 includes an improved foundation or hull 12 that supports a tower 14, described below in detail. The tower 14 supports a wind turbine 16. The hull 12 is semi-submersible, and is structured and configured to float, semi-submerged, in a body of water. Typically, a lower portion of the hull 12 may be submerged at a depth within the range of about 30 ft to about 100 ft (about 9.1 m to about 30.5 m). Accordingly, a portion of the hull 12 will be above water when the hull 12 is floating, semi-submerged, in the water, and a portion of the hull 12 is also below the waterline WL. As used herein, the waterline WL is defined as the approximate line where the surface of the water meets the floating wind turbine platform 10. Mooring lines 18 may be attached to the floating wind turbine platform 10 and further attached to anchors, such as the anchors 20 in the seabed S to limit to movement of the floating wind turbine platform 10 on the body of water.

As will be described in greater detail below, and best shown in FIG. 2, the illustrated hull 12 may be formed from three bottom beams 22 that extend radially outwardly from a keystone 24 and provide buoyancy. When assembled together, the bottom beams 22 and the keystone 24 define a base 25. An interior or center column 26 is mounted to the keystone 24, and three outer columns 28 are mounted at or near the distal ends of the bottom beams 22. The center column 26 and the outer columns 28 extend outwardly (upwardly when viewing FIGS. 1 and 2) and perpendicularly to the bottom beams 22, and also provide buoyancy. Longitudinal axes of the center column 26 and the outer columns 28 are also substantially parallel. Additionally, the center column 26 supports the tower 14. Support members or top beams 30 extend radially from, and are connected to, the center column 26, and are also connected to each of the outer columns 28. The tower 14 is mounted to the center column 26.

If desired, access-ways or catwalks 32 may be attached to each top beam 30. Each catwalk 32 may be connected by a connecting catwalk or tower access platform 32a mounted around all or a portion of a base of the tower 14. Access ladders 33 may mounted to one or more of the center column 26 and the outer columns 28.

In the embodiments illustrated herein, the wind turbine 16 is a horizontal-axis wind turbine. Alternatively, the wind turbine may be a vertical-axis wind turbine, such as shown at 16' in FIG. 1A. The size of the wind turbine 16 will vary based on the wind conditions at the location where the floating wind turbine platform 10 is anchored and the desired power output. For example, the wind turbine 16 may have an output of about 5 MW. Alternatively, the wind turbine 16 may have an output within the range of from about 1 MW to about 10 MW.

The wind turbine 16 includes a rotatable hub 34. At least one rotor blade 36 is coupled to and extends outward from the hub 34. The hub 34 is rotatably coupled to an electric generator (not shown). The electric generator may be coupled via a transformer (not shown) and an underwater power cable 21, as shown in FIG. 1, to a power grid (not shown). In the illustrated embodiment, the rotor has three rotor blades 36. In other embodiments, the rotor may have more or less than three rotor blades 36. A nacelle 37 is attached to the wind turbine 16 opposite the hub 34.

Figure 3:
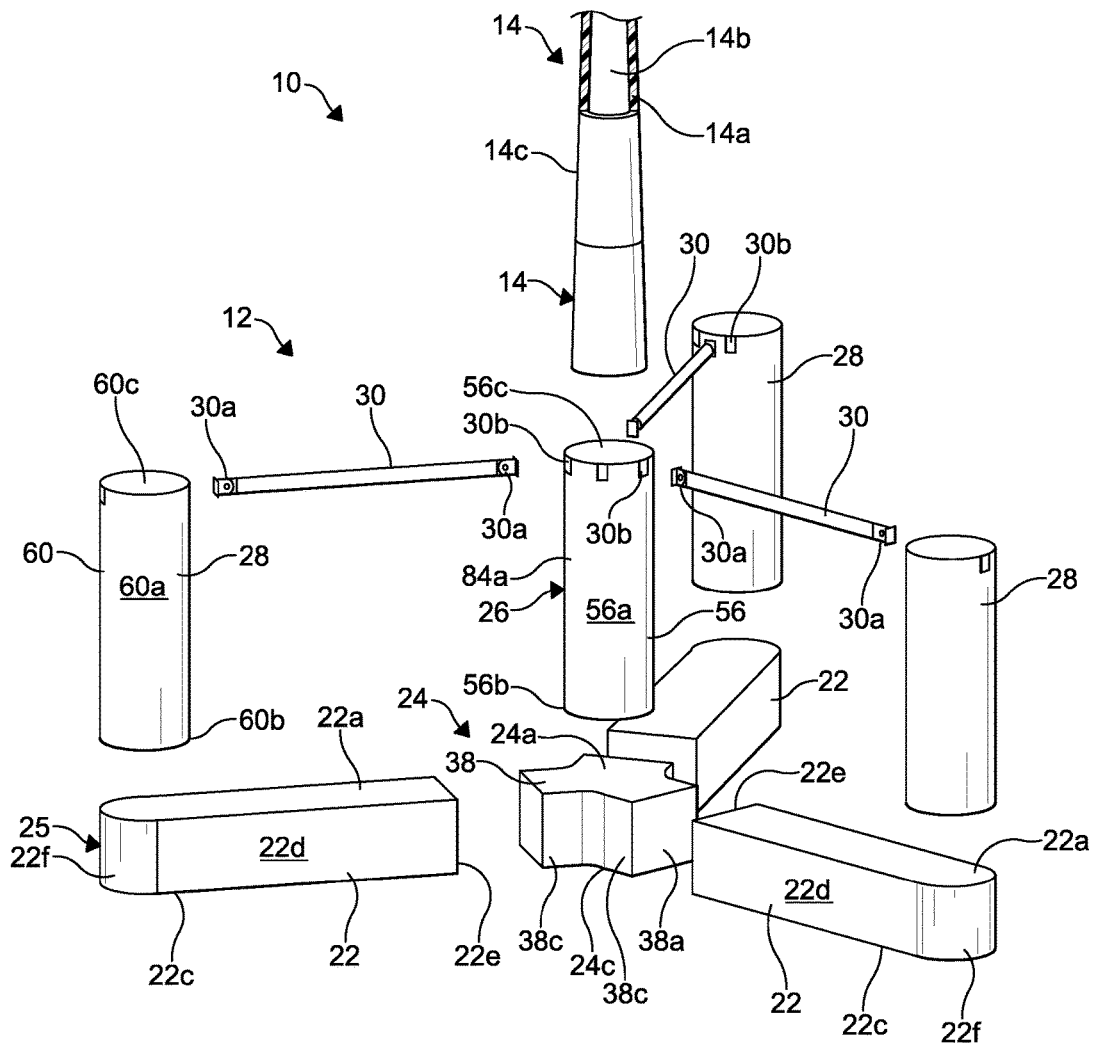
FIG. 3 is an exploded perspective view of the improved floating wind turbine platform illustrated in FIGS. 1 and 2.

As shown in FIG. 3, the keystone 24 includes an upper wall 24a, a lower wall 24c, and three radially outwardly extending legs 38. Each leg 38 includes an end wall 38a defining a substantially vertical connection face to which the bottom beams 22 will be attached, and opposing side walls 38c.

In the illustrated embodiment, the keystone 24 includes three legs 38. Alternatively, the keystone 24 may include four or more legs for the attachment of four or more bottom beams 22.

The illustrated keystone 24 is formed from pre-stressed reinforced concrete, and may include an internal central cavity (not shown). Each leg 38 may also include an internal leg cavity (not shown). Any desired process may be used to manufacture the keystone 24, such as a spun concrete process, with conventional concrete forms, or with reusable concrete forms in a semi-automated process such as used in the precast concrete industry. The concrete of the keystone 24 may be reinforced with any conventional reinforcement material, such as high tensile steel cable and high tensile steel reinforcement bars or REBAR. Alternatively, the keystone 24 may be formed from FRP, steel, or combinations of pre-stressed reinforced concrete, FRP, and steel.

As also shown in FIG. 3, each bottom beam 22 includes an upper wall 22a, a lower wall 22c, opposing side walls 22d, a first end wall 22e, which will be connected to the end wall 38a of the leg 38 of the keystone 24, and a semi-cylindrical second end wall 22f. Like the keystone 24, the illustrated bottom beams 22 are formed from pre-stressed reinforced concrete as described above. Alternatively, the bottom beams 22 may be formed from FRP, steel, or combinations of pre-stressed reinforced concrete, FRP, and steel.

If desired, one or more first ballast chambers, such as described below, may be formed in each bottom beam 22. Also, one or more second ballast chambers 48 may be formed in each outer column 28.

When formed and cured, the keystone 24 and the bottom beams 22 may be assembled and post-tensioned longitudinally to define the base 25. Additionally, each bottom beam 22 may be post-tensioned in a direction transverse to its longitudinal axis. The keystone 24 and the bottom beams 22 may be post-tensioned by any desired post-tensioning method, thus applying a compressive force between the keystone 24 and the bottom beams 22. For example, tendons (not shown) may be extended through ducts 120, described below, in the bottom beams 22 and ducts (not shown) in the keystone 24. Such tendons may be post-tensioned longitudinally, wherein the tendons are stressed and suitably anchored to the keystone 24 and the bottom beams 22. Because these tendons are maintained in a permanently stressed; i.e., elongated, condition, they apply a compressive force on the concrete of the keystone 24 and the bottom beams 22. Similarly, when formed and cured, the center column 26 may be post-tensioned to the keystone 24, and three outer columns 28 may be post-tensioned to the bottom beams 22, as described above to define the hull 12.

Referring again to FIG. 3, the center column 26 includes a cylindrical side wall 56 having an outer surface 56a, a first axial end 56b, a second axial end wall 56c, and defines a hollow interior space (not shown). Similarly, the outer columns 28 include a cylindrical side wall 60 having an outer surface 60a, a first axial end 60b, a second axial end wall 60c, and define a hollow interior space (not shown). Like the keystone 24 and the bottom beams 22, the illustrated center column 26 and the outer columns 28 are formed from pre-stressed reinforced concrete as described above. Alternatively, the center column 26 and the outer columns 28 may be formed from FRP, steel, or combinations of pre-stressed reinforced concrete, FRP, and steel. The center column 26 and the outer columns 28 may be formed in sections, as described in detail below.

The illustrated floating wind turbine platform 10 includes three bottom beams 22 and three outer columns 28. It will be understood however, that the improved floating wind turbine platform 10 may be constructed with four or more bottom beams 22 and outer columns 28.

Referring to FIG. 3, the top beams 30 are configured as substantially axially loaded members and extend substantially horizontally between upper ends of the center column 26 and each outer column 28. In the illustrated embodiment, the top beams 30 are formed of tubular steel having an outside diameter of about 4 ft (1.2 m). Alternatively, the top beams 30 may be formed from FRP, pre-stressed reinforced concrete, or combinations of pre-stressed reinforced concrete, FRP, and steel. Each top beam 30 includes mounting brackets 30a at each end. The mounting brackets 30a are configured to be attached, such as by threaded fasteners, to attachment members 30b, such as steel plates, on the center column 26 and each outer column 28.

The top beams 30 are further designed and configured substantially not to resist the bending moment of the base of the tower 14, and do not carry a bending load. Rather, the top beams 30 receive and apply tensile and compressive forces between the center column 26 and the outer columns 28.

The illustrated top beams 30 are formed from steel having a diameter of about 3 ft to about 4 ft and are lighter and thinner than similar beams formed from reinforced concrete. The use of relatively lighter and thinner top beams 30; i.e., axially loaded members, at the upper portion of the floating wind turbine platform 10 allows for the distribution of more relative weight at the bottom of the floating wind turbine platform 10 platform structure where it is needed most. The reduction in weight can be significant. For example, a concrete member weighing about 800,000 pounds may be replaced with a steel beam weighing about 70,000 pounds, thus also providing advantageous savings in material and construction cost.

In the illustrated embodiment, the tower 14 is tubular having an outer wall 14a defining a hollow interior space 14b, and may have any suitable outside diameter and height. In the illustrated embodiment, the outside diameter of the tower 14 tapers from a first diameter at its base to a second, smaller diameter at its upper end. The illustrated tower 14 is formed from fiber reinforced polymer (FRP) composite material. Non-limiting examples of other suitable composite materials include glass and carbon FRP. The tower may also be formed from a composite laminate material. Alternatively, the tower 14 may be formed from concrete or steel in the same manner as the components of the hull 12, described in detail above. The tower 14 may be formed in any number of sections 14c.

Advantageously, the tower 14 formed from composite material as described above will have reduced mass above the waterline WL relative to a conventional steel tower. Because the FRP composite tower 14 has reduced mass, the mass of the hull 12, including any ballast, required below the water line WL to maintain stability of the floating wind turbine platform 10 may also be reduced. This will reduce the overall cost of the wind generating device.

Figure 4:
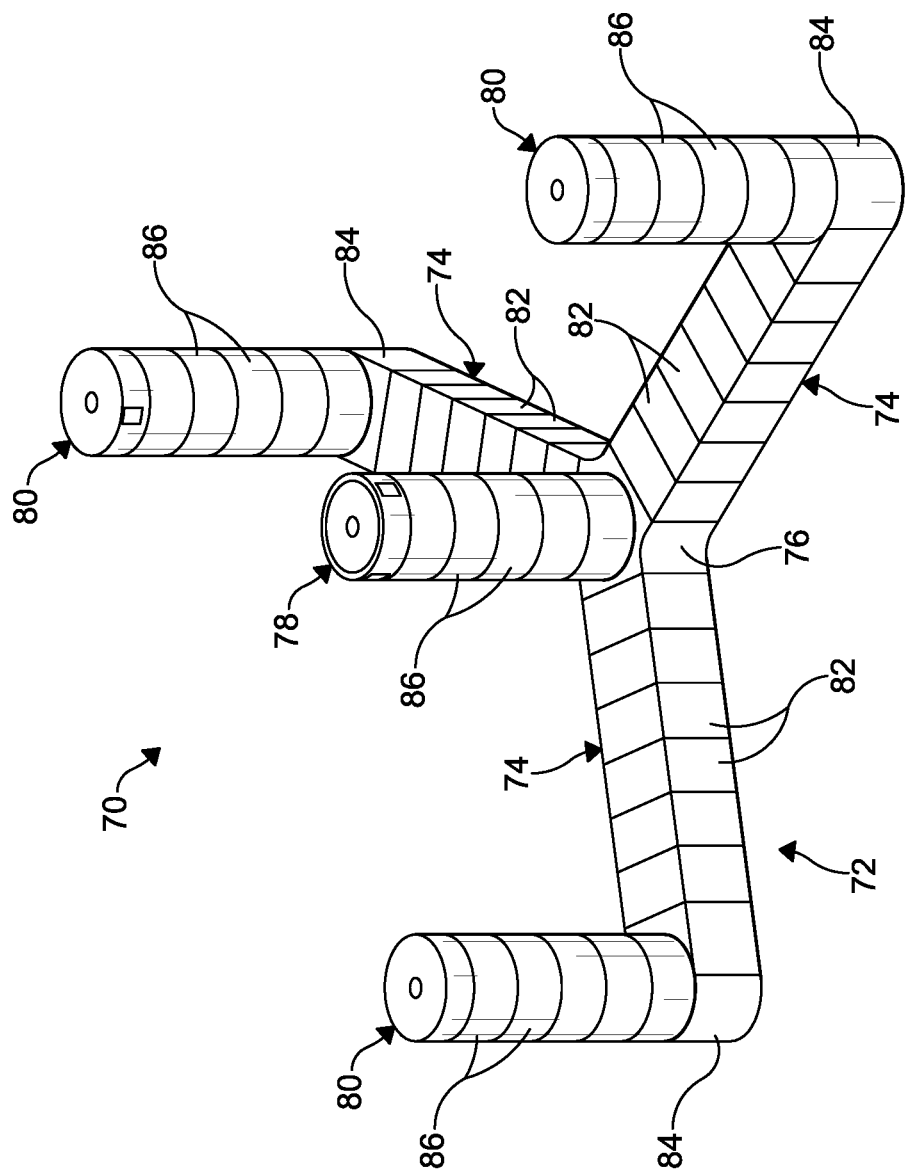
FIG. 4 is a perspective view of a second embodiment of the hull illustrated in FIGS. 1 and 2.

A second embodiment of the hull is shown at 70 in FIG. 4. As shown in FIG. 4, the hull 70 includes a base 72, also shown in FIG. 5, comprising three buoyant bottom beams 74 that extend radially outwardly from a keystone 76. A center column 78 is mounted to the keystone 76, and three outer columns 80 are mounted at or near the distal ends of the bottom beams 74. Although three buoyant bottom beams 74 are shown in FIG. 4, it will be understood that the hull 70 may include more than three buoyant bottom beams 74.

As described in detail below, the bottom beams 74 may be formed from a plurality of beam sections 82 and a column base section 84, upon which the outer columns 80 are mounted. The bottom beams 74 may be formed from any desired number of beam sections 82, such as the six beam sections 82 illustrated in FIG. 4, less than six beam sections 82, or more than six beam sections 82. If desired, the keystone 76 may also be formed in any desired number of sections (not shown).

As also described in detail below, the center column 78 and the outer columns 80 may be similarly formed from a plurality of column sections 86. The center column 78 and the outer columns 80 may be formed from any desired number of column sections 86, such as the six column sections 86 illustrated in FIG. 4, less than six column sections 86, or more than six column sections 86. It will be understood that the center column 78 may be formed from column sections 86 that have a different size than the column sections 86 that form the outer columns 80.

When formed and cured, the keystone 76 and the bottom beams 74 may be assembled and post-tensioned longitudinally to define the base 72 as described above. Similarly, when formed and cured, the column sections 86 may be assembled to onto the keystone 76 and onto the column base sections 84 of each bottom beam 74 to form the center column 78 and the outer columns 80, respectively. The column sections 86 of the center column 78 and the outer columns 80 may be post-tensioned as described above to define the hull 70.

Figure 5:
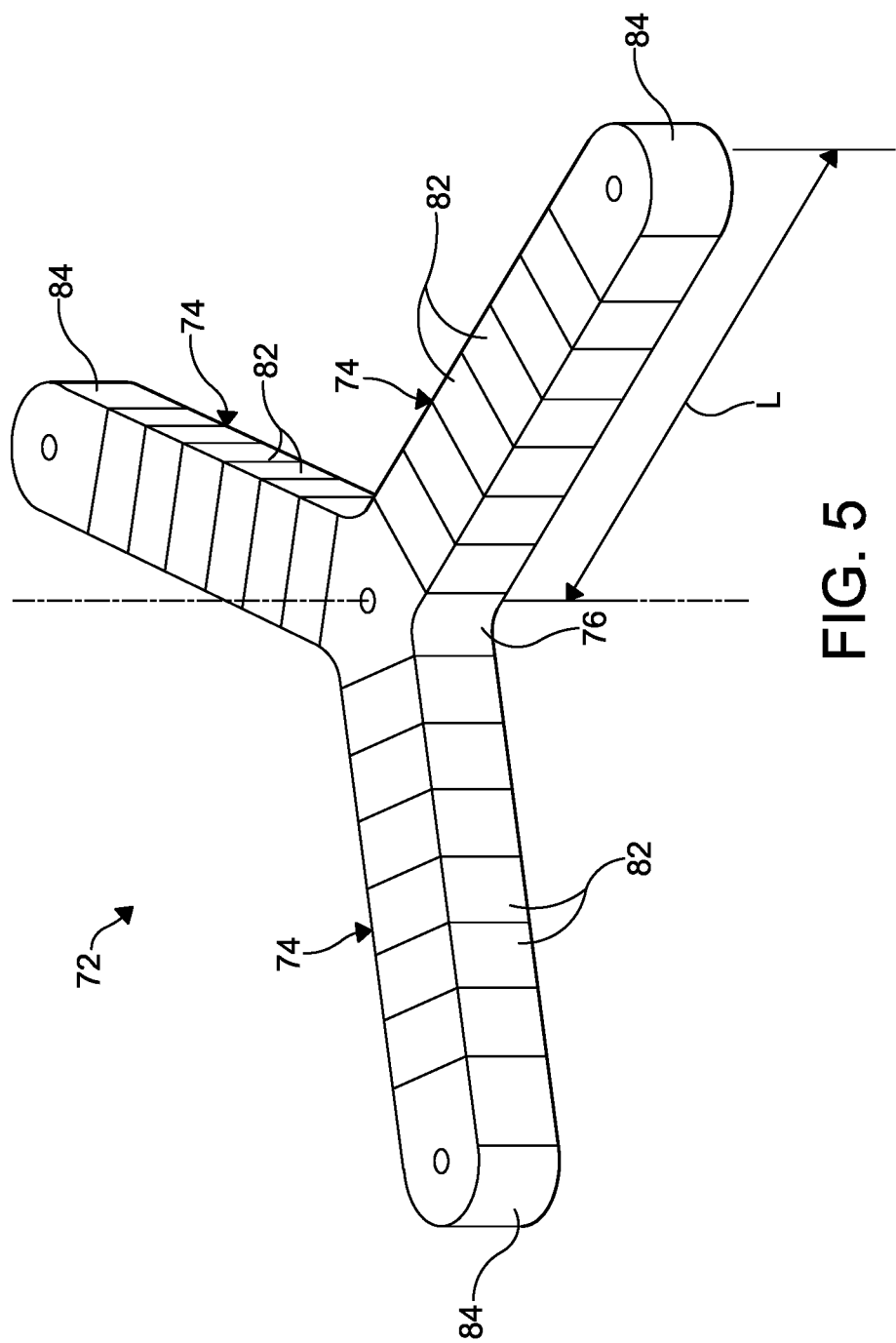
FIG. 5 is a perspective view of the base illustrated in FIG. 4.

The size and dimensions of the floating wind turbine platform 10 may be determined by the size of the wind turbine 16 mounted thereon. For example, as best shown in FIG. 5, for a 6 MW wind turbine 16, the length L of a leg or wing of the base 72, as measured from a center of the keystone 76 to a distal end of the bottom beam 74 is about 140 ft to about 160 ft, and the fully assembled floating wind turbine platform 10 may weigh 7,200 tons or more.

Figure 6:
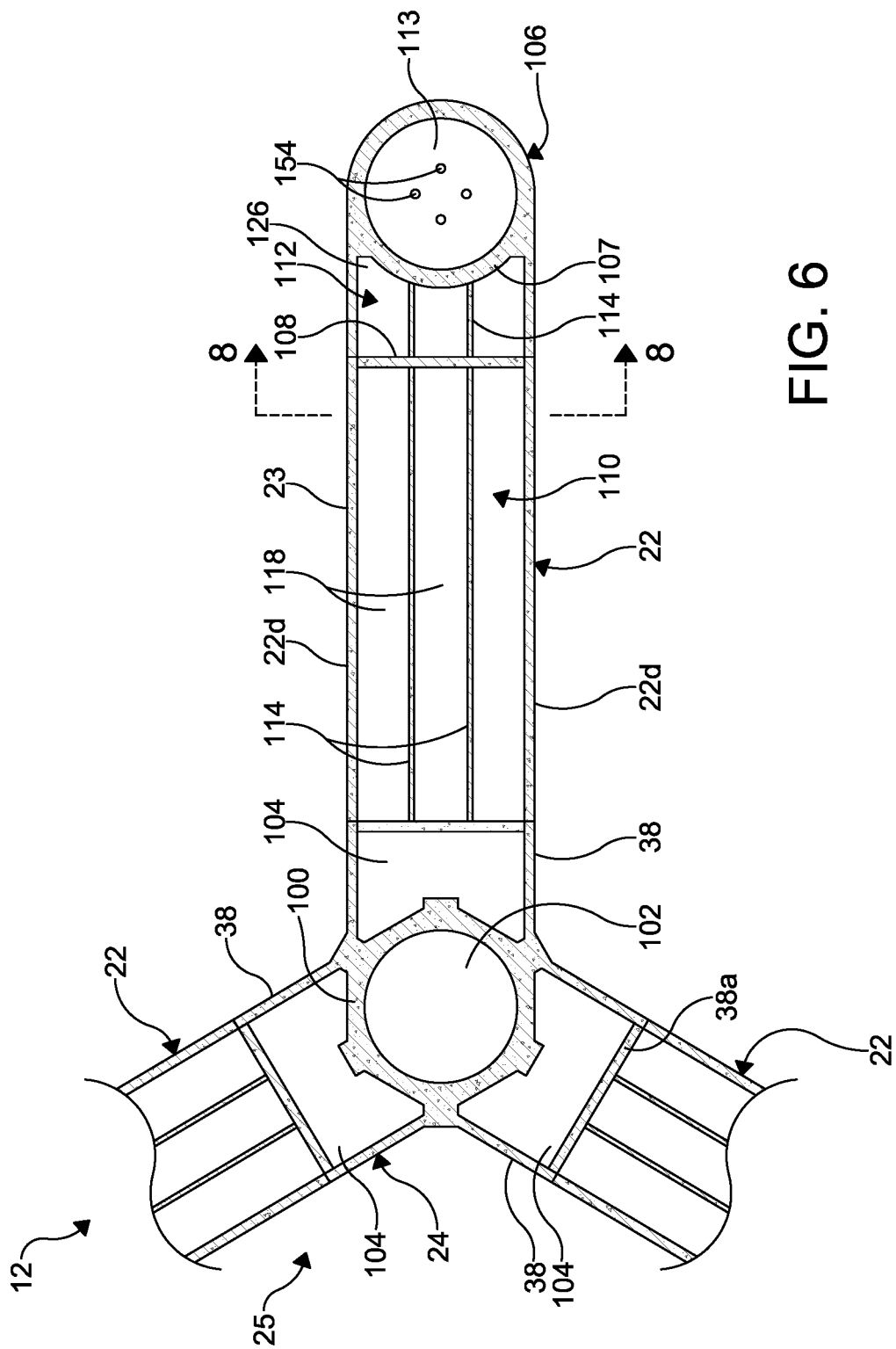
FIG. 6 is a cross sectional view taken along the line 6-6 of FIG. 1.

Referring now to FIG. 6, a cross-sectional view of the base 25 of the hull 12 is shown. As described above, the base 25 includes the keystone 24 and three radially extending bottom beams 22, each of which may be formed from reinforced concrete. The keystone 24 includes a substantially cylindrical inner wall 100, the interior of which defines a pump room 102, described in detail below. Each end wall 38a of the legs 38 defines a first watertight bulkhead. Watertight compartments 104 are defined in each leg 38 between the inner wall 100 and each bulkhead 38a.

Each bottom beam 22 includes a first or primary beam portion 23 and a column base portion 106 having a substantially cylindrical wall portion 107. A second watertight bulkhead 108 separates an interior of the primary beam portion 23 from an interior of the column base portion 106, and further separates the bottom beam 22 into a primary ballast compartment 110 and a trim ballast compartment 112.

Figure 11:
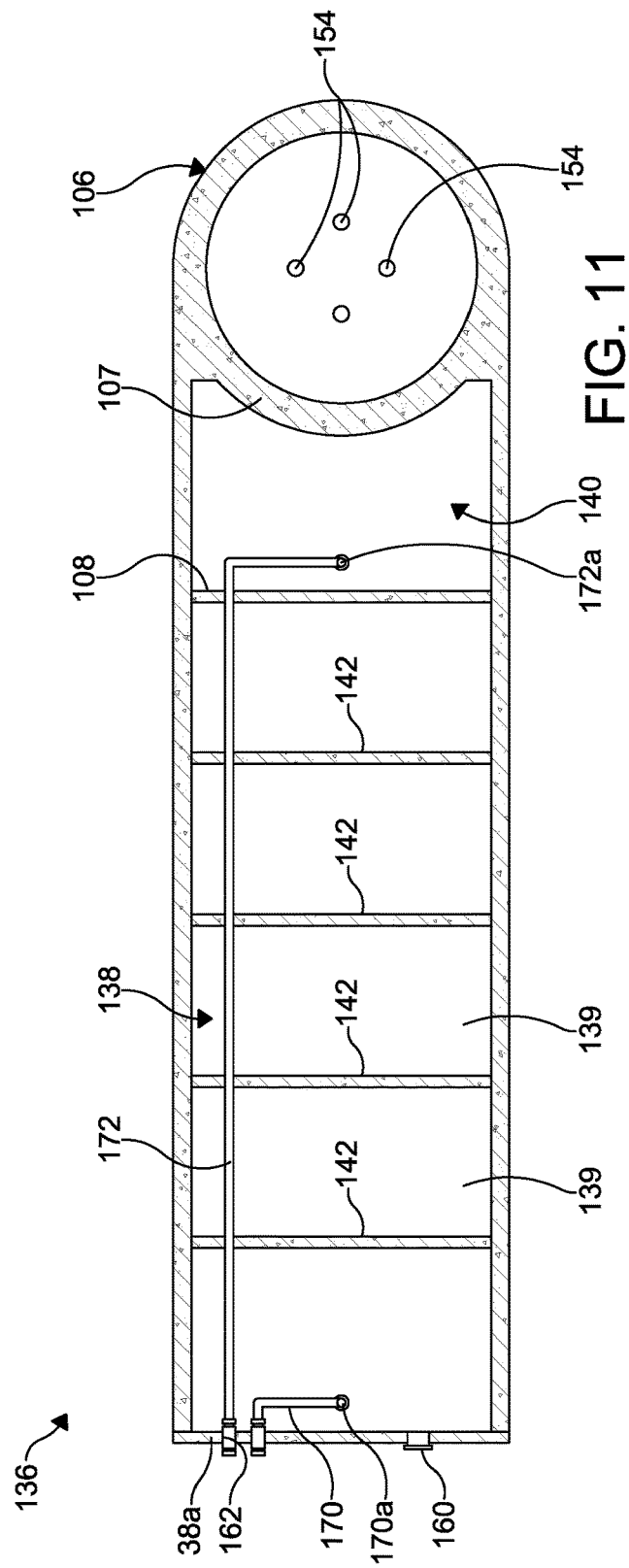
FIG. 11 is a cross sectional view taken along the line 11-11 of FIG. 7 and showing the bottom beam.

It will be understood that the first watertight bulkhead 38a may be formed as an end wall of each leg 38 of the keystone 24, as shown in FIG. 3, or may be formed as an end wall of each bottom beam, such as shown in the bottom beam 136 illustrated in FIG. 11. Alternatively, a watertight bulkhead, such as the first watertight bulkhead 38a, may be formed as an end wall on both the legs 38 of the keystone 24 and the bottom beams 22 and 136.

As shown in FIG. 6, the end walls 38a of the legs 38 define the first watertight bulkhead. Alternatively, the first end wall 22e, as shown in FIG. 3, may define the first watertight bulkhead.

Figure 8:
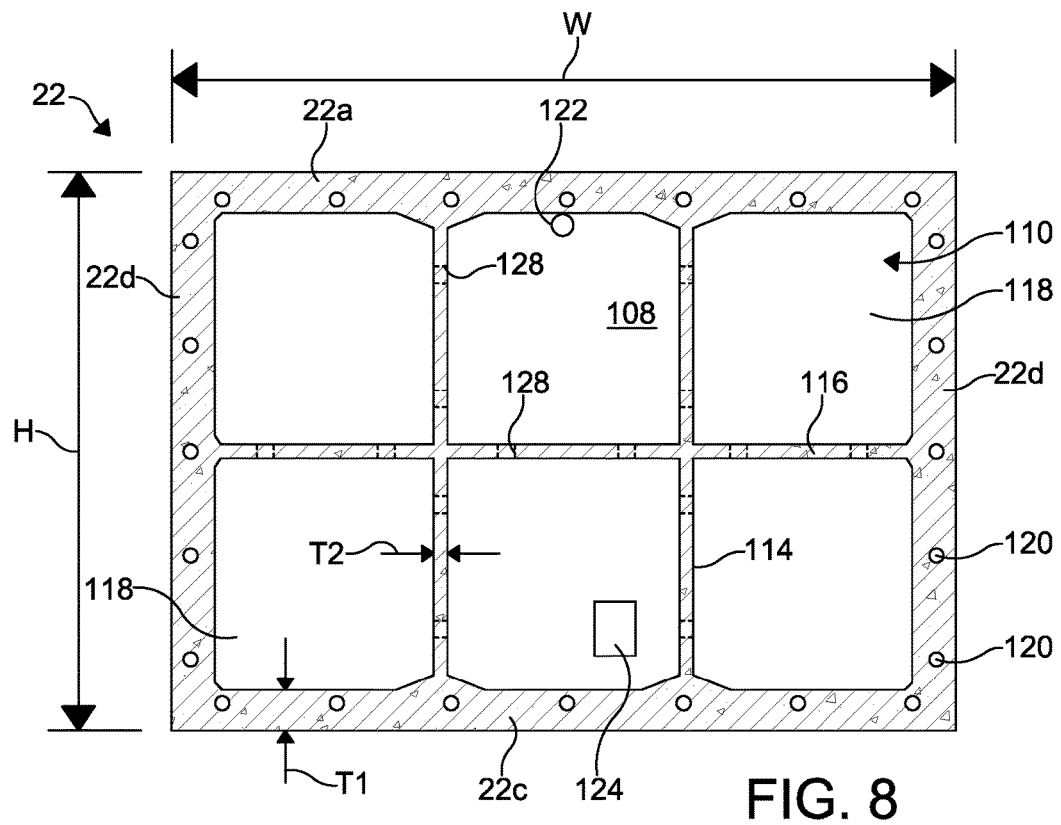
FIG. 8 is a cross sectional view taken along the line 8-8 of FIG. 6.

Referring to FIGS. 6 and 8, the primary ballast compartment 110 may include a plurality of longitudinally extending first beam inner walls 114 and at least one longitudinally extending second beam inner wall 116. The first beam inner walls 114 and the second beam inner wall 116 divide the primary ballast compartment 110 into primary ballast chambers 118. As shown in FIG. 8, the first beam inner walls 114 are substantially parallel with the side walls 22d and the second beam inner walls 116 are substantially parallel with the lower wall 22c. The outer walls 22a, 22c, 22d, and 22f of the bottom beam 22 may have a thickness T1 within the range of about 1.0 ft to about 2.5 ft (about 0.305 m to about 0.762 m). Alternatively, the thickness T1 of outer walls 22a, 22c, 22d, and 22f may be less than about 1.0 ft (0.305 m) or greater than about 2.5 ft (0.762 m). The beam inner walls 114 and 116 may have a thickness T2 within the range of about 6.0 in to about 10.0 (about 152 mm to about 254 mm). Alternatively, the thickness T2 of inner walls 114 and 116 may be less than about 6.0 in (152 mm) or greater than about 10.0 in (254 mm).

The beam inner walls 114 and 116 may also be formed in the trim ballast compartment 112, thereby dividing the trim ballast compartment 112 into trim ballast chambers 126. An interior of the substantially cylindrical wall portion 107 also defines a trim ballast compartment 113. Fluid passages (not shown) may connect the trim ballast compartments 112 to the trim ballast compartment 113.

A plurality of the ducts 120 may extend longitudinally through the outer walls 22a, 22c, 22d, and 22f of the bottom beam 22.

The second watertight bulkhead 108 may include one or more openings 122 through which pipes, such as the water pipes 170 and 172 described below, may extend. The second watertight bulkhead 108 may also include a watertight portal 124 through which a person may travel through the bulkhead 108.

The bottom beam 22 may have a height H within the range of about 20.0 ft to about 24.0 ft (about 6.1 m to about 7.3 m). Alternatively, the height H may be less than about 20.0 ft (6.1 m) or greater than about 24.0 ft (7.3 m). The bottom beam 22 may have a width W within the range of about 29.0 ft to about 33.0 ft (about 8.8 m to about 10.0 m). Alternatively, the width W may be less than about 29.0 ft (8.8 m) or greater than about 33.0 ft (10.0 m).

The beam inner walls 114 may have a length slightly shorter than a length of the primary ballast compartment 110 within which the beam inner walls 114 are formed or mounted. For example, the inner walls 114 may have a length about 3.0 in (about 76.2 mm) shorter than the length of the primary ballast compartment 110. This shorter length of the beam inner walls 114 creates a gap between the beam inner walls 114 and one or both of the bulkheads 38a and 108, thereby allowing water to flow around the ends of the beam inner walls 114. Additionally, the beam inner walls 114 and 116 may include weep holes 128 formed therethrough to allow for water to move between the primary ballast chambers 118. The beam inner walls 114 and 116 may have any desired number and size of weep holes 128.

Figure 2:
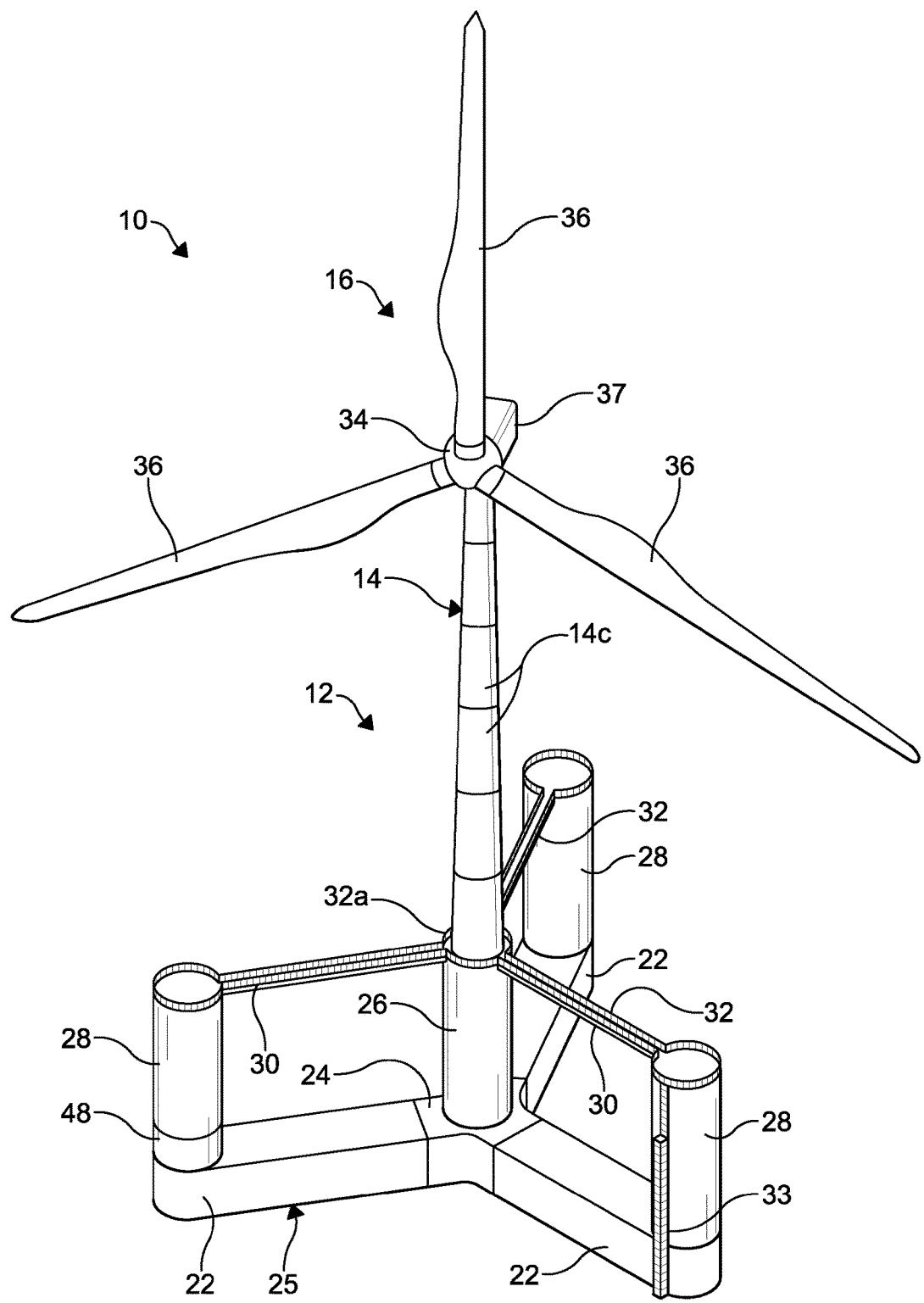
FIG. 2 is a perspective view of the improved floating wind turbine platform illustrated in FIG. 1.

The bottom beam 22 may be formed as a single piece structure as shown in FIGS. 2, 3, and 6. Alternatively, the bottom beam may be formed in sections, as shown in FIG. 4 wherein the bottom beam 74 is formed from a plurality of the beam sections 82 and a column base section 84.

Figure 9:
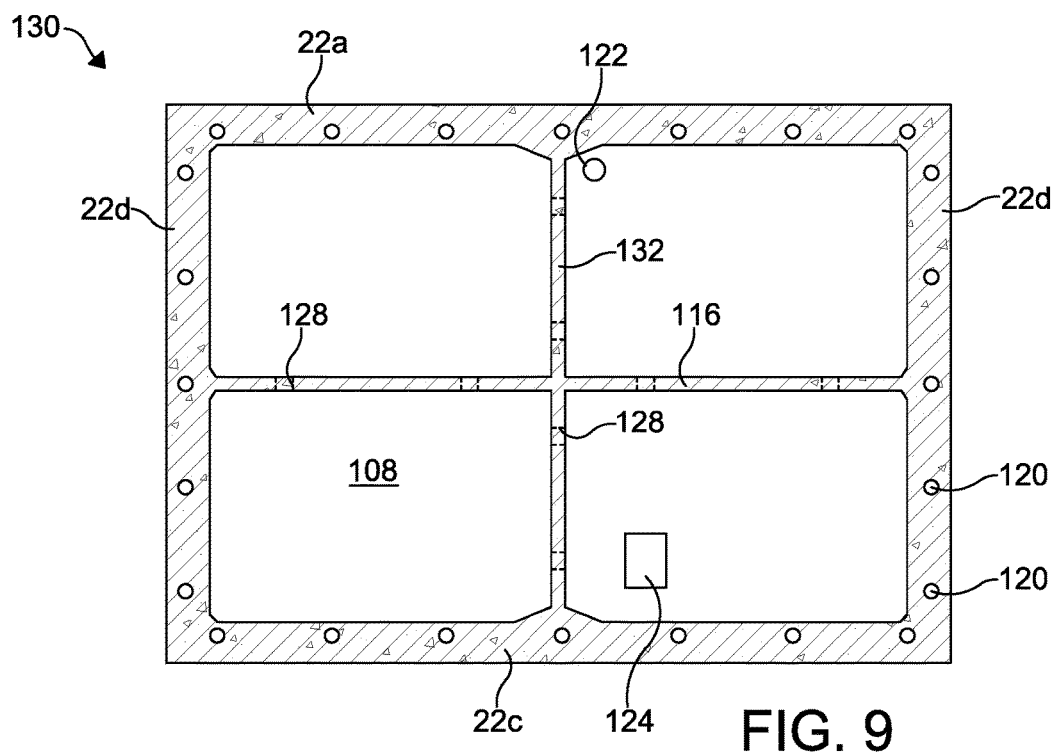
FIG. 9 is a cross sectional view of an alternate embodiment of the bottom beam illustrated in FIG. 8.

FIG. 9 illustrates an alternative embodiment of the bottom beam 130. The bottom beam 130 is similar to the bottom beam 22 and includes the outer walls 22a, 22c, and 22d, the second watertight bulkhead 108, and the primary ballast compartment 110. The primary ballast compartment 110 of the bottom beam 130 however, includes only one longitudinally extending first beam inner wall 132 and the second beam inner wall 116. The first beam inner wall 132 and the second beam inner wall 116 divide the primary ballast compartment 110 into four primary ballast chambers 134. The beam inner walls 132 and 116 may also include the weep holes 128 formed therethrough to allow for water to move between the primary ballast chambers 134.

Figure 7:
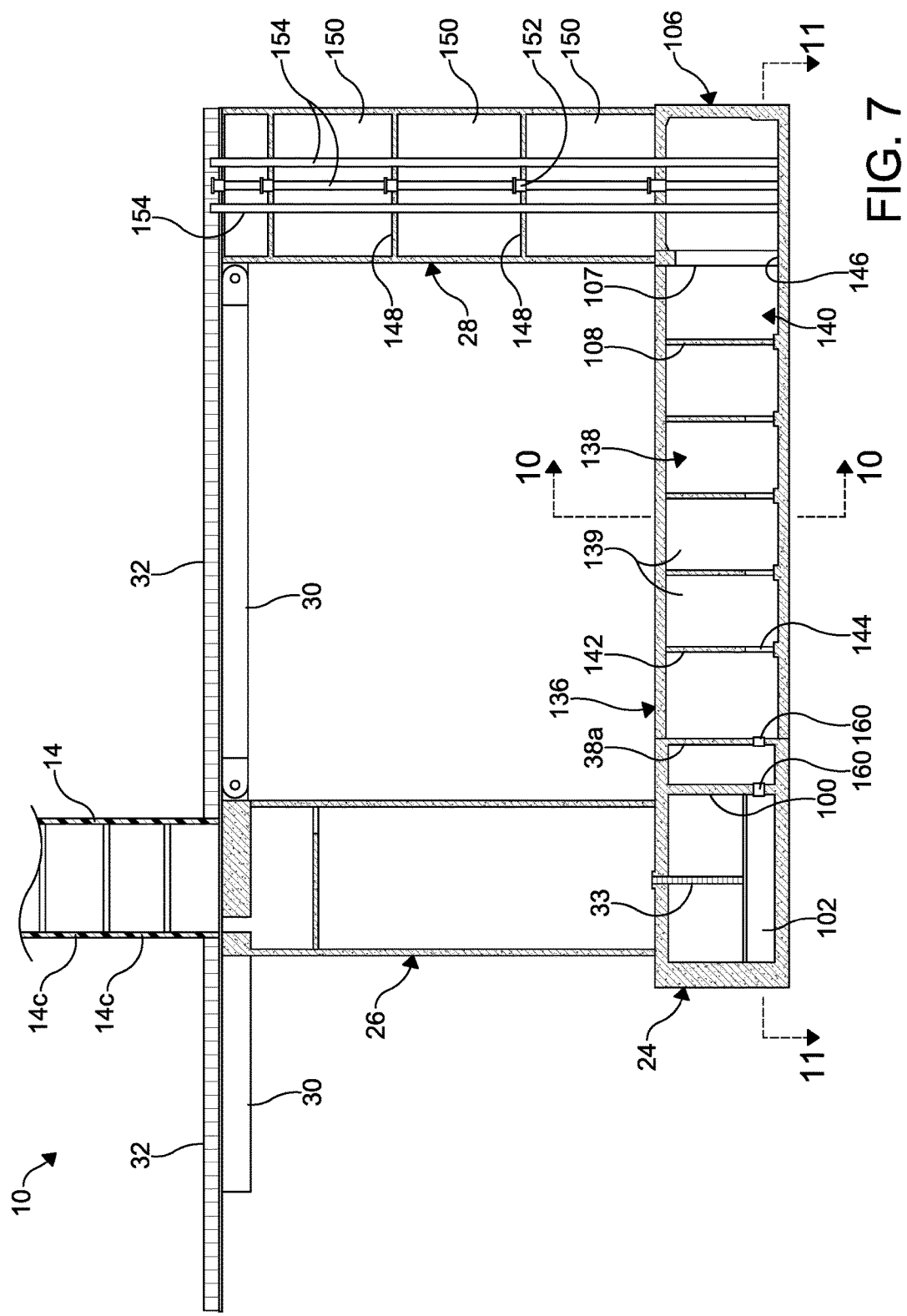
FIG. 7 is a cross sectional view of a portion of the improved hull illustrated in FIGS. 1 and 2.

FIG. 7 is a cross-sectional elevational view of a portion of the floating wind turbine platform 10. The illustrated floating wind turbine platform 10 includes an alternate embodiment of the bottom beam 136. The bottom beam 136 includes an alternate embodiment of the primary ballast compartment 138 and an alternate embodiment of the trim ballast compartment 140.

Figure 10:
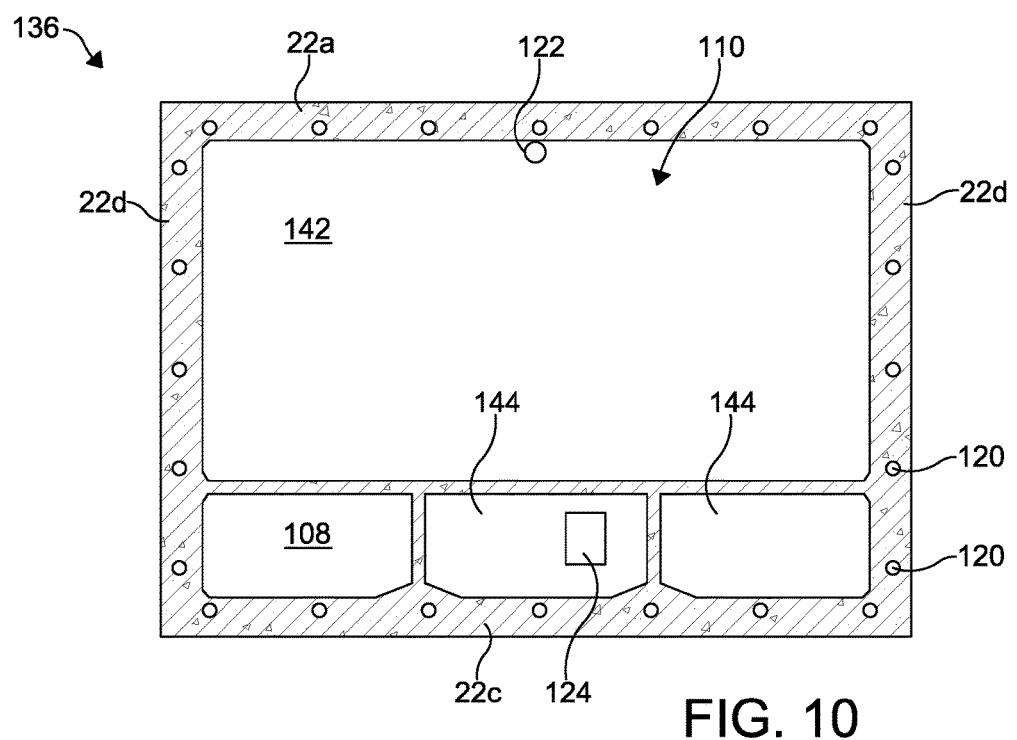
FIG. 10 is a cross sectional view taken along the line 10-10 of FIG. 7.

Referring to FIGS. 7, 10, and 11, the primary ballast compartment 138 includes a plurality of inner walls or baffle plates 142 longitudinally spaced apart and defining primary ballast chambers 139 therebetween. The baffle plates 142 are substantially parallel with the bulkhead 38a. Each baffle plate 142 includes a plurality of fluid flow openings 144 formed therethrough and may include one or more of the openings 122 through which the water pipes 170 and 172 may extend. Similarly, the substantially cylindrical wall portion 107 may include one or more fluid flow openings 146 formed therethrough.

The outer columns 28 may include floors 148 defining column compartments 150 therebetween. Watertight portals 152 may be provided in each floor 148 through which a person may travel. A ladder (not shown), similar to the ladder 33, may extend between portals 152 in adjacent floors 148.

A plurality of support pipes 154 extends from the distal upper end of each outer column 28 and into the column base portion 106 of the bottom beam 22 to which the outer column 28 is mounted. As best shown in FIGS. 6 and 11, four support pipes 154 are provided. The support pipes 154 are formed of metal, such as steel and copper nickel, or non-metals such as fiberglass and glass reinforced epoxy (GRE) fiberglass, and have a diameter of about 8.0 in (about 203 mm). Alternatively, the support pipes 154 may have a diameter within the range of about 6.0 in to about 10.0 in (about 152 mm to about 254 mm). If desired, the diameter of the pipes may be less than about 6.0 in (152 mm) or greater than about 10.0 in (254 mm).

The support pipes 154 have a dual function as support members or support columns for the outer column 28 and as access conduits for vents and sounds. As support columns, the support pipes 154 provide additional strength to the reinforced concrete outer column. As access conduits, each pipe 154 may have openings in one or more of the column compartments 150. If unwanted water floods any of the column compartments 150, or a portion of any of the column compartments 150, a conventional pump (not shown) may be inserted through a pipe 154 to the flooded column compartment 150 so that the unwanted water may be pumped therefrom.

Figure 12:
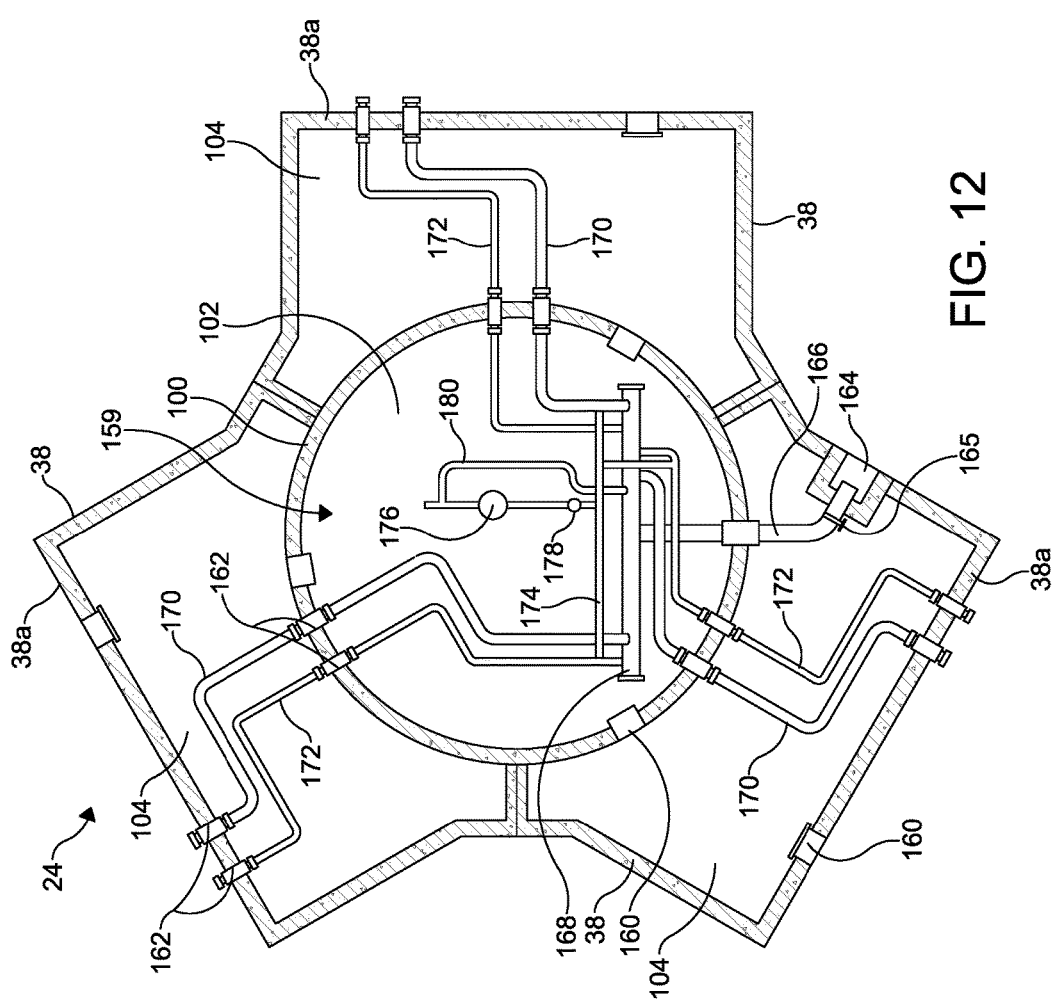
FIG. 12 is an enlarged cross sectional view of the keystone illustrated in FIG. 6.

FIG. 12 is an enlarged cross-sectional view of the keystone 24 showing the pump room 102, the watertight compartments 104 within in each leg 38, and a water distribution system 159 mounted therein. As shown in FIG. 12, each bulkhead 38a, and the portion of the inner wall 100 within each watertight compartment 104 may include a watertight portal 160 portal through which a person may travel. Additionally, each bulkhead 38a, and the portion of the inner wall 100 within each watertight compartment 104 may also include one or more pipe openings 162 through which the pipes water 170 and 172, described below, may extend.

The water distribution system 159 includes a sea chest 164 is formed in a side wall 38c of a leg 38 of the keystone 24 and a plurality of ballast fill pipes. For example, a ballast fill pipe 166 extends from the sea chest to a ballast manifold 168 within the pump room 102. The ballast fill pipe 166 may include a sea chest valve 165 for closing and opening the ballast fill pipe 166 at the sea chest 164. The ballast fill pipe 166 has a diameter of about 12.0 in (about 304 mm). Alternatively, the ballast fill pipe 166 may have a diameter within the range of about 10.0 in to about 14.0 in (about 254 mm to about 355 mm). If desired, the diameter of the ballast fill pipe 166 may be less than about 10.0 in (254 mm) or greater than about 14.0 in (355 mm).

Primary ballast fill pipes 170 extend from the manifold 168 through each leg 38 and through the pipe openings 162 in the bulkhead 38a of each leg 38. Similarly, trim ballast fill pipes 172 also extend from the manifold 168 through each leg 38 and through the pipe openings 162 in the bulkhead 38a of each leg 38. The trim ballast fill pipes 172 are also connected to each other by a trim ballast fill connecting pipe 174.

A ballast pump 176 and a water filter 178 may be provided in a pump pipe 180 that extends between the manifold 168 and the trim ballast fill connecting pipe 174.

As shown in FIG. 11, the primary ballast fill pipes 170 and the trim ballast fill pipes 172 continue through the bulkhead 38a and into the bottom beam 136. The primary ballast fill pipes 170 extend into the primary ballast compartment 138 and terminate at an open end 170a through which water may flow. Similarly, the trim ballast fill pipes 172 extend through the primary ballast compartment 138 and into the trim ballast compartment 140, and terminate at an open end 172a through which water may flow.

Typically, a floating wind turbine platform will be manufactured and/or assembled on or near shore and then towed to a location in the body of water BW wherein the floating wind turbine platform and its attached wind turbine will be placed in to operation, such as a wind turbine farm (not shown). Alternatively, the floating wind turbine platform may be moved to a desired location on a floating barge, such as a semi-submersible barge (not shown).

When towing the improved floating wind turbine platform 10 in the body of water BW, or moving the improved floating wind turbine platform 10 on a barge, the primary ballast compartments 138 and the trim ballast compartment 140 may be empty. The empty primary ballast compartments 138 and the empty trim ballast compartment 140 provide the improved floating wind turbine platform 10 with a minimum draft. This is advantageous when moving the improved floating wind turbine platform 10 from and within shallow water, such as near a port.

When the improved floating wind turbine platform 10 reaches a location in the body of water BW wherein the depth is greater than about 30 ft (about 9.1 m), water may be introduced from the body of water into the primary ballast compartments 138 through the sea chest 164. Water will be introduced into the primary ballast compartments 138 until the primary ballast compartments 138 are filled or substantially filled with water and the improved floating wind turbine platform 10 achieves its operating draft, such as within the range of about 30 ft to about 100 ft (about 9.1 m to about 30.5 m).

The sea chest valve 165 may be moved between an open and a closed position and may be controlled mechanically or electronically by control means located on or within the hull 12 and 70, including within the keystone 24 and 76. Water may be discharged from, or filled into, the primary ballast compartments 138 via the ballast pump 176 and the pipes 166, 168, and 170 in the pump room 102.

As described above, when towing the improved floating wind turbine platform 10 in the body of water BW, or moving the improved floating wind turbine platform 10 on a barge, the trim ballast compartment 140 may also be empty.

When the improved floating wind turbine platform 10 is being towed, the trim ballast compartment 140 may, however, be filled or partially filled before or during transit to help trim the improved floating wind turbine platform 10 so as to achieve a near vertical orientation.

Upon the improved floating wind turbine platform 10 reaching its operating draft, such as within the range of about 30 ft to about 100 ft (about 9.1 m to about 30.5 m), the trim ballast compartments 140 may be filled to about ⅓ of their capacity via the ballast pump 176 and the pipes 166, 168, 172, and 174 in the pump room 102. Water may also be pumped from any one of the trim ballast compartments 140 to another one of the trim ballast compartments 140. Because the trim ballast compartments 140 are about ⅓ full, two of the trim ballast compartments 140 may be emptied to fill a third one of the trim ballast compartments 140. This process may be used to trim improved floating wind turbine platform 10 during wind turbine 16 operations, if for example, the improved floating wind turbine platform 10 becomes damaged or unbalanced for any other reason.

Figure 13:
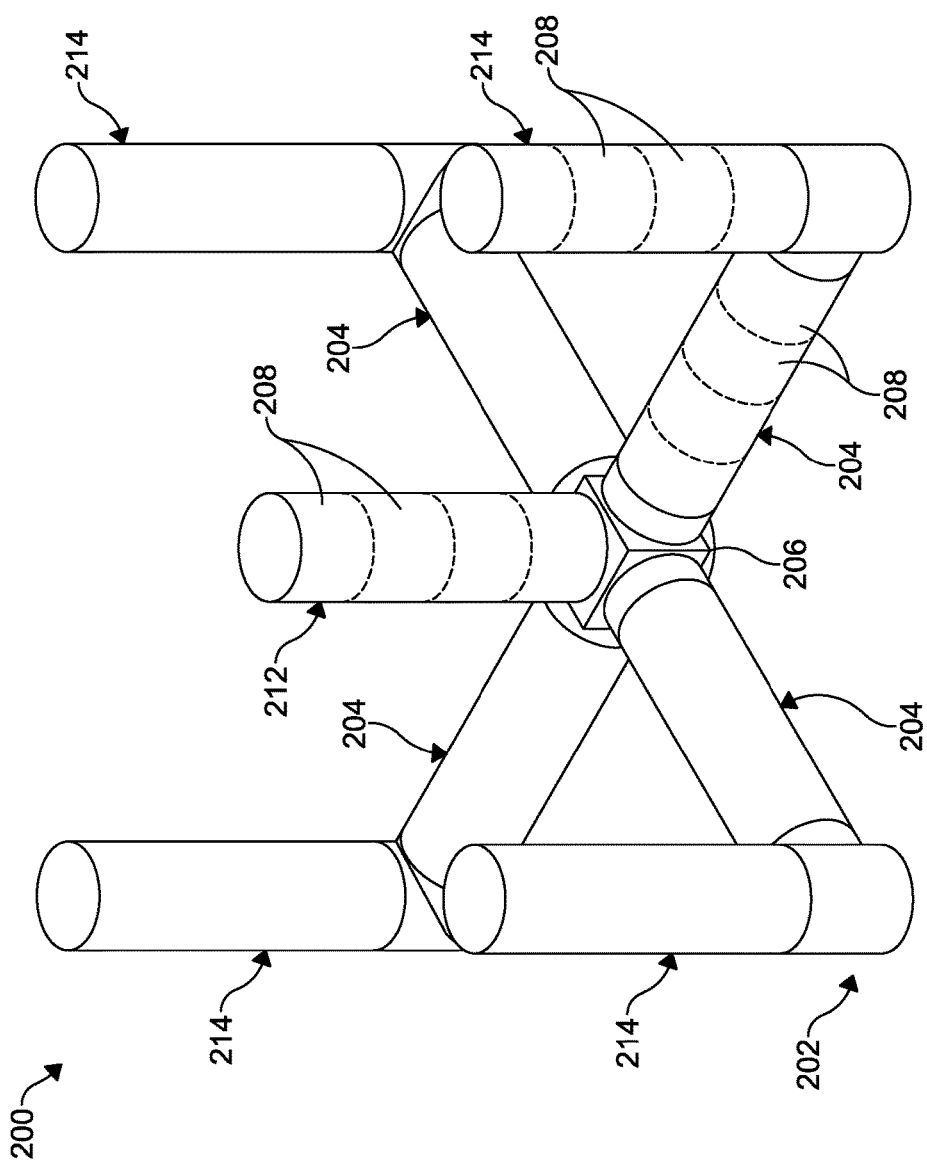
FIG. 13 is a perspective view of a third embodiment of the hull illustrated in FIGS. 1 and 2.

Referring to FIG. 13, a third embodiment of a hull for a floating wind turbine platform is shown at 200. The illustrated hull 200 includes a base 202 comprising four buoyant bottom beams 204 that extend radially outwardly from a keystone 206. The bottom beams 204 may be formed from a plurality of hull sections 208 and a column base section 210. The bottom beams 204 may be formed from any desired number of hull sections 208, such as the four hull sections 208 illustrated in FIG. 13, less than four hull sections 208, or more than four hull sections 208. If desired, the keystone 206 may also be formed in any desired number of sections (not shown). Although four buoyant bottom beams 204 are shown in FIG. 13, it will be understood that the hull 200 may include three buoyant bottom beams 204 or more than four buoyant bottom beams 204.

The keystone 206 is configured receive and have attached thereto, the four bottom beams 204. The keystone 206 may be configured to receive and have attached thereto three buoyant bottom beams 204 or more than four buoyant bottom beams 204.

A center column 212 is mounted to the keystone 206, and four outer columns 214 are mounted to the column base sections 210 at the distal ends of the bottom beams 204. Like the bottom beams 204, the center column 212 and the outer columns 214 may be formed from a plurality of the hull sections 208.

As shown, the bottom beams 204, the center column 212 and the outer columns 214 are substantially cylindrical having a substantially circular cross-sectional shape. Significantly, the bottom beams 204, the center column 212, and the outer columns 214 may have the same diameter, and thus may be assembled from the same hull sections 208. The use of the common hull section 208 in each of the bottom beams 204, the center column 212, and the outer columns 214 reduces manufacturing costs and improves manufacturing efficiency. It will be understood however, that the bottom beams 204, the center column 212, and the outer columns 214 may have different diameters.

Like the bottom beams 204, the center column 212 and the outer columns 214 may be formed from any desired number of hull sections 208, such as the four hull sections 208 illustrated in FIG. 13, less than four hull sections 208, or more than four hull sections 208.

The internal structure and function of the keystone 206 and the attached bottom beams 204; i.e., primary ballast compartments, the trim ballast compartments, the pipes, valves, and the pump may be substantially the same as described in detail above in reference to the hulls disclosed in FIGS. 6 through 12, and will not be describe further.

As described above, the improved floating wind turbine platform 10 may have an operating draft within the range of about 30 ft to about 100 ft (about 9.1 m to about 30.5 m). Likewise, a floating wind turbine platform having the hull 200 may also have an operating draft within the range of about 30 ft to about 100 ft (about 9.1 m to about 30.5 m).

The principle and mode of operation of this invention have been explained and illustrated in its preferred embodiment. However, it must be understood that this invention may be practiced otherwise than as specifically explained and illustrated without departing from its spirit or scope.

What is claimed is:

1. A hull for a semi-submersible wind turbine platform capable of floating on a body of water and supporting a wind turbine, the hull comprising:
   a keystone; and
   at least three bottom beams extending radially outward of the keystone, the hull characterized in that:
   each bottom beam has a primary beam portion and a column base portion, wherein the column base portion is configured to support an outer column of the hull thereon, and wherein the primary beam portion defines a first ballast compartment therein;
   the first ballast compartment is in fluid communication with water in the body of water in which the hull is floating; and
   a water distribution system mounted in at least one of the keystone and each of the bottom beams, wherein the first ballast compartment is in fluid communication with water in the body of water in which the hull is floating via the water distribution system, wherein portions of the water distribution system are mounted in the keystone and in each of the bottom beams, and wherein the water distribution system includes:
   a sea chest formed in one of the keystone and a bottom beam, the sea chest open to water in the body of water in which the hull is floating;
   first ballast fill pipes extending between the sea chest and each of the first ballast compartments; and
   a water pump mounted to the first ballast fill pipes between the sea chest and each of the first ballast compartments, the water pump configured to pump water in and out of the first ballast compartments.

2. The hull for a semi-submersible wind turbine platform according to claim 1, wherein the keystone has a watertight pump room defined therein, and within which the water pump and a portion of the water distribution system are mounted.

3. The hull for a semi-submersible wind turbine platform according to claim 1, wherein the column base portion of each bottom beam is separated from the primary beam portion by a watertight bulkhead, and wherein the column base portion defines a trim ballast compartment therein.

4. The hull for a semi-submersible wind turbine platform according to claim 3, further including a water distribution system mounted in at least one of the keystone and each of the bottom beams, wherein the first ballast compartment and the trim ballast compartment are in fluid communication with water in the body of water in which the hull is floating via the water distribution system.

5. The hull for a semi-submersible wind turbine platform according to claim 4, wherein portions of the water distribution system are mounted in the keystone and in each of the bottom beams.

6. The hull for a semi-submersible wind turbine platform according to claim 5, wherein the water distribution system includes:
   a sea chest formed in one of the keystone and a bottom beam and open to water in the body of water in which the hull is floating,
   first ballast fill pipes extending between the sea chest and each of the first ballast compartments;
   second ballast fill pipes extending between the sea chest and each of the trim ballast compartments; and
   a water pump mounted to the first and second ballast fill pipes between the sea chest and each of the first ballast compartments and the trim ballast compartments, the water pump configured to pump water in and out of the first ballast compartments and the trim ballast compartments.

7. The hull for a semi-submersible wind turbine platform according to claim 5, wherein the keystone has a watertight pump room defined therein, and within which the water pump and a portion of the water distribution system are mounted.

8. The hull for a semi-submersible wind turbine platform according to claim 6, wherein the water distribution system is configured to selectively pump water in and out of any one of the trim ballast compartments, and to selectively pump water between a first one of the trim ballast compartments and at least one of a second and third one of the trim ballast compartments.

9. The hull for a semi-submersible wind turbine platform according to claim 3, further including an outer column extending perpendicularly from an upper surface of the column base portion of each bottom beam, the trim ballast compartment within the column base portion being positioned below the outer column mounted thereto.

10. A hull for a semi-submersible wind turbine platform capable of floating on a body of water and supporting a wind turbine, the hull comprising:
    a keystone;
    at least three bottom beams extending radially outward of the keystone, the hull characterized in that each bottom beam is substantially cylindrical in shape and has as substantially circular transverse cross section; and
    a water distribution system;
    wherein each bottom beam has a primary beam portion and a column base portion;
    wherein the column base portion is configured to support an outer column of the hull thereon;
    wherein the primary beam portion defines a first ballast compartment therein;
    wherein the first ballast compartment is in fluid communication with water in the body of water in which the hull is floating;
    wherein the first ballast compartment is in fluid communication with water in the body of water in which the hull is floating via the water distribution system;
    wherein portions of the water distribution system are mounted in the keystone and in each of the bottom beams; and
    wherein the water distribution system includes:

a sea chest formed in one of the keystone and a bottom beam, the sea chest open to water in the body of water in which the hull is floating;

first ballast fill pipes extending between the sea chest and each of the first ballast compartments;

a water pump mounted to the first ballast fill pipes between the sea chest and each of the first ballast compartments, the water pump configured to pump water in and out of the first ballast compartments; and a watertight pump room defined within the keystone within which the water pump and a portion of the water distribution system are mounted.

11. The hull for a semi-submersible wind turbine platform according to claim 10, wherein the column base portion of each bottom beam is separated from the primary beam portion by a watertight bulkhead, and wherein the column base portion defines a trim ballast compartment therein.

12. The hull for a semi-submersible wind turbine platform according to claim 11, further including a water distribution system mounted in at least one of the keystone and each of the bottom beams, wherein the first ballast compartment and the trim ballast compartment are in fluid communication with water in the body of water in which the hull is floating via the water distribution system, wherein portions of the water distribution system are mounted in the keystone and in each of the bottom beams, and wherein the water distribution system includes:

a sea chest formed in one of the keystone and a bottom beam and open to water in the body of water in which the hull is floating, first ballast fill pipes extending between the sea chest and each of the first ballast compartments;

second ballast fill pipes extending between the sea chest and each of the trim ballast compartments; and a water pump mounted to the first and second ballast fill pipes between the sea chest and each of the first ballast compartments and the trim ballast compartments, the water pump configured to pump water in and out of the first ballast compartments and the trim ballast compartments.

13. The hull for a semi-submersible wind turbine platform according to claim 10, further including:

a center column extending perpendicularly from an upper surface of the keystone, a first axial end of the center column attached to the keystone, the center column configured to have a tower attached to a second axial end thereof; and outer columns, one of which extends perpendicularly from an upper surface of the column base portions of each bottom beam, first axial ends of the outer columns attached to column base portions.

14. The hull for a semi-submersible wind turbine platform according to claim 13, wherein each of the center and outer columns is substantially cylindrical in shape and has as substantially circular transverse cross section.

15. A hull for a semi-submersible wind turbine platform capable of floating on a body of water and supporting a wind turbine, the hull comprising:

a keystone; and at least three bottom beams extending radially outward of the keystone, the hull characterized in that:

each bottom beam has a primary beam portion and a column base portion, wherein the column base portion is configured to support an outer column of the hull thereon, and wherein the primary beam portion defines a first ballast compartment therein; and the first ballast compartment is in fluid communication with water in the body of water in which the hull is floating;

wherein the column base portion of each bottom beam is separated from the primary beam portion by a watertight bulkhead, and wherein the column base portion defines a trim ballast compartment therein.

16. A hull for a semi-submersible wind turbine platform capable of floating on a body of water and supporting a wind turbine, the hull comprising:

a keystone; and at least three bottom beams extending radially outward of the keystone, the hull characterized in that each bottom beam is substantially cylindrical in shape and has as substantially circular transverse cross section;

wherein each bottom beam has a primary beam portion and a column base portion, wherein the column base portion is configured to support an outer column of the hull thereon, and wherein the primary beam portion defines a first ballast compartment therein;

wherein the first ballast compartment is in fluid communication with water in the body of water in which the hull is floating;

wherein the column base portion of each bottom beam is separated from the primary beam portion by a watertight bulkhead; and wherein the column base portion defines a trim ballast compartment therein.

* * * * *